2,927,855

SEPARATION OF TANTALUM

Wayne H. Keller, Waban, and Joseph P. Martin, Waltham, Mass., assignors to National Research Corporation, Cambridge, Mass., a corporation of Massachusetts No Drawing. Application December 31, 1957
Serial No. 706,301

2 Claims. (Cl. 75—121)

This invention relates to the production of tantalum metal, and particularly to the separation of tantalum metal from the byproduct mixture resulting from the reduction of potassium fluotantalate with sodium metal.

The principal object of the present invention is to provide a process for separating tantalum metal from a mixture thereof with the byproduct potassium fluoride, sodium fluoride and excess $K_2TaF_7$.

Another object of the invention is to provide such a process which is rapid and relatively cheap.

Another object of the invention is to provide such a process which does not contaminate the product tantalum metal.

The invention accordingly comprises the process involving the several steps and the relation and the order of one or more of such steps with respect to each of the others which are exemplified in the following detailed disclosure and the scope of the application of which will be indicated in the claims.

For a fuller understanding of the nature and objects of the invention, reference should be had to the following detailed description.

In the production of tantalum metal by the metallothermic reduction of potassium fluotantalate with sodium, there is produced a mixture of crystalline aggregates of tantalum metal imbedded in solid potassium fluoride and sodium fluoride. This mixture of fluorides is extremely insoluble in water and is very difficult to separate from the tantalum metal. Additionally, there may be present some unreacted potassium fluotantalate or other fluorides of tantalum even though these unreduced forms of tantalum are present in relatively small quantities.

As described in copending application of Martin Serial No. 706,300, filed on even date herewith, one preferred treatment of this complex mixture of tantalum metal, potassium fluoride, sodium fluoride and residual potassium fluotantalate involves the leaching with an aqueous acid solution containing sufficient aluminum ion to provide a ratio of aluminum ion to fluoride ion between about 1/1 and 1/6. This aluminum ion leach removes the great bulk of the alkali fluorides, but does provide some residual materials which are apparently capable of occluding oxygen in the final tantalum metal. It is believed that this oxide may be in the form of hydrolyzed fluotantalate or other forms of tantalum oxide which is relatively insoluble in the aluminum-ion-containing leach.

In the present invention the product from the aluminum-ion leach is further leached in an aqueous solution containing hydrofluoric acid and hydrogen peroxide. In the preferred embodiment of the invention, the aqueous solution contains between .1 and 10 weight percent of hydrogen fluoride, a preferred embodiment having about ½ weight percent hydrogen fluoride. The concentration of hydrogen peroxide varies between about .5 weight percent and 10 weight percent, a preferred concentration being about 1.7 weight percent.

Example I 550 grams of a reaction mixture consisting essentially of 181 grams of tantalum metal, 43 grams of $K_2TaF_7$, 116 grams of KF and 210 grams of NaF was removed from a reaction pot and crushed to a more or less uniform size of about 4–100 mesh. This product was added to a solution containing 665 grams of aluminum $Al_2(SO_4)_3$ and 8560 grams of an 8% solution of $H_2SO_4$. This gave a ratio of mols of aluminum ion to mols of fluoride ion (in NaF+KF) of 1 to 1.8. This ratio of aluminum ion to fluoride ion is 1 to 1.63 when calculated on the basis of fluoride ion in the residual $K_2TaF_7$ as well. The mixture was agitated for 60 minutes, allowed to settle for 30 minutes and then decanted to separate the leach liquor from the residual solids. The residual solids were treated again as above and the product tantalum metal was then briefly leached in an etching solution containing 10 grams of HF and 34 grams of $H_2O_2$ and 1956 grams of water. This leach was agitated for 30 minutes, permitted to settle for 15 minutes, the leach liquor was drained off and the product was again leached in a similar solution containing the same concentrations of HF and $H_2O_2$ for another 30 minutes with a 15-minute settling time. This was followed with several additional sulfuric acid leaches. The product was rinsed with water, finally leached with methanol and dried under vacuum. The product had an oxygen content of .02% and a Brinell hardness of 110.

Example II

The procedure of Example I was repeated with a similar batch of tantalum containing raw material except that the hydrogen peroxide was omitted from the aqueous hydrogen fluoride leach. In this case the oxygen content of this final tantalum was about 0.03 percent.

While the exact mechanism involved in the improvement in oxygen content obtained by the use of hydrogen peroxide is not completely understood, it is believed to involve the formation of $Ta_2O_5$ by reaction of the hydrogen peroxide with tantalum hydroxides or tantalum oxyfluorides present in the mixture resulting from the aluminum sulfuric acid leaches. These tantalum hydroxides and/or oxyfluorides are believed to result from reaction of the first leach liquids with unreacted $K_2TaF_7$ remaining in the mixture taken out of the reactor. Since the $Ta_2O_5$ is slightly soluble in the aqueous HF solution, it is accordingly dissolved out of the mass of solid tantalum particles and it is removed with the leach liquor. Accordingly, it is not physically entrapped in the tantalum to contaminate the tantalum on final melting.

Since certain changes may be made in the above process without departing from the scope of the invention herein involved, it is intended that all matter contained in the above description, shall be interpreted as illustrative and not in a limiting sense.

What is claimed is:

1. In the process of separating tantalum metal from a mixture thereof with potassium fluoride and sodium fluoride wherein the bulk of the contaminants are leached out of the mixture by use of an aqueous leach, improvement which comprises further leaching the partially purified tantalum in an aqueous solution of hydrogen fluoride and hydrogen peroxide.

2. In the process of separating tantalum metal from a mixture thereof with potassium fluoride and sodium fluoride wherein the bulk of the contaminants are leached out of the mixture by use of an aqueous leach, the improvement which comprises further leaching the partially purified tantalum in an aqueous solution containing between 0.1 and 10 weight percent of hydrogen fluoride and between .5 and 10 weight percent of hydrogen peroxide.

References Cited in the file of this patent

UNITED STATES PATENTS

| | | |
|---|---|---|
| 2,707,149 | McKinley | Apr. 26, 1955 |
| 2,724,667 | MacPherson | Nov. 22, 1955 |
| 2,758,024 | Feder et al. | Aug. 7, 1956 |

FOREIGN PATENTS

| | | |
|---|---|---|
| 738,149 | Great Britain | Oct. 5, 1955 |
| 65,485 | France | Oct. 19, 1955 |
| 750,355 | Great Britain | June 13, 1956 |